(12) United States Patent
Vianello et al.

(10) Patent No.: US 11,017,293 B2
(45) Date of Patent: May 25, 2021

(54) METHOD OF PROGRAMMING AN ARTIFICIAL NEURON NETWORK

(71) Applicant: COMMISSARIAT A L'ENERGIE ATOMIQUE ET AUX ENERGIES ALTERNATIVES, Paris (FR)

(72) Inventors: Elisa Vianello, Grenoble (FR); Olivier Bichler, Massy (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 867 days.

(21) Appl. No.: 15/237,104

(22) Filed: Aug. 15, 2016

(65) Prior Publication Data

US 2017/0053202 A1 Feb. 23, 2017

(30) Foreign Application Priority Data

Aug. 18, 2015 (FR) ........................................ 1557781

(51) Int. Cl.
*G06N 3/08* (2006.01)
*G06N 3/063* (2006.01)

(52) U.S. Cl.
CPC ............. *G06N 3/08* (2013.01); *G06N 3/0635* (2013.01)

(58) Field of Classification Search
CPC ......... G06N 3/08; G06N 3/0635; G06N 3/063
See application file for complete search history.

(56) References Cited

U.S. PATENT DOCUMENTS

2013/0242642 A1 9/2013 Katayama et al.
2014/0192585 A1* 7/2014 Hashim ................... H01L 45/08
365/148

FOREIGN PATENT DOCUMENTS

EP 2 765 575 A1 8/2014
FR 3002072 * 8/2014 ............. G11C 13/00

OTHER PUBLICATIONS

Suri et al. ("OXRAM Based ELM Architecture for Multi-Class Classification Applications," 2015 IEEE International Conference on Neural Networks (IJCNN), Killarney, Jul. 2015, pp. 1-8) (Year: 2015).*

(Continued)

*Primary Examiner* — Kakali Chaki
*Assistant Examiner* — Robert Lewis Kulp
(74) *Attorney, Agent, or Firm* — Pillsbury Winthrop Shaw Pittman LLP

(57) ABSTRACT

A programming method for an artificial neuron network having synapses, each including a single resistive random-access memory having first and second electrodes on either side of an active zone, the method including determining a number N of conductance intervals, where N≥3; for each memory: choosing a conductance interval from amongst the N intervals; a step i) for application of a voltage pulse of a first type between the first and second electrodes, and for reading the conductance value of the memory; if the conductance value does not belong to the previously chosen conductance interval, a sub-step ii) for application of a voltage pulse of a second type between the first and second electrodes, and for reading the conductance value; if the conductance value does not belong to the chosen conductance interval, a step according to which step i) is reiterated, with steps i) and ii) being repeated until the conductance value belongs to the interval.

15 Claims, 4 Drawing Sheets

(56) References Cited

OTHER PUBLICATIONS

Wu et al. ("Low-Power TiN/Al2O3/Pt resistive switching device with sub-20 microamp switching current and gradual resistance modulation", Journal of Applied Physics 110, 094103, 2011, pp. 1-5) (Year: 2011).*

Suri et al. ("Bio-Inspired Stochastic Computing Using Binary CBRAM Synapses," IEEE Transactions on Electronic Devices, vol. 60, No. 7, Jul. 2013, pp. 2402-2409) (Year: 2013).*

Hu et al. ("The Stochastic Modeling of TiO2 Memristor and Its Usage in Neuromorphic System Design", 2014 19th Asia and South Pacific Design Automation Conference (ASP-DAC), IEEE, 2014, pp. 831-836) (Year: 2014).*

Search Report as issued in French Patent Application No. 1557781, dated May 16, 2016.

Suri, M., et al., "Bio-Inspired Stochastic Computing Using Binary CBRAM Synapses," IEEE Transactions on Electron Devices, vol. 60, No. 7, Jul. 2013, XP011515274, pp. 2402-2409.

Garbin, D., et al., "On the Impact of OxRAM-based Synapses Variability on Convolutional Neural Networks Performance," Proceedings of the 2015 IEEE/ACM International Symposium on Nanoscale Architectures, Jul. 2015, XP055274483, pp. 193-197.

Suri, M., et al., "Impact of PCM Resistance-Drift in Neuromorphic Systems and Drift-Mitigation Strategy," 2013 IEEE/ACM International Symposium on Nanoscale Architectures, Jul. 2013, XP032498572, pp. 140-145.

DeSalvo, B., et al., "Emerging Resistive Memories for Low Power Embedded Applications and Neuromorphic Systems," 2015 IEEE International Symposium on Circuits and Systems, May 2015, XP055274476, pp. 3088-3091.

Suri, M., et al., "CBRAM Devices as Binary Synapses for Low-Power Stochastic Neuromorphic Systems: Auditory (Cochlea) and Visual (Retina) Cognitive Processing Applications," 2012 International Electron Devices Meeting, Dec. 2012, XP032341709, pp. 10.3.1-10-.3.4.

Bichler, O., "Chapitre 5: Implémentations matérielles sur des technologies memristives," Contribution à la conception d'architecture de calcul auto-adaptative integrant des nanocomposants neuromorphiques et applications potentielles, Nov. 2012, XP055110632, retrieved from the Internet: <http://tel.archives-ouvertes.fr/tel-00781811> [retrieved Mar. 28, 2014], 37 pages.

* cited by examiner

METHOD OF PROGRAMMING AN ARTIFICIAL NEURON NETWORK

CROSS REFERENCE TO RELATED APPLICATIONS

This application claims priority to French Patent Application No. 1557781, filed Aug. 18, 2015, the entire content of which is incorporated herein by reference in its entirety.

TECHNICAL FIELD OF THE INVENTION

The technical field of the invention is that of artificial neuron networks, or neuromorphic circuits. The present invention relates to a method for programming an artificial neuron network.

TECHNOLOGICAL BACKGROUND TO THE INVENTION

Artificial neuron networks are a subject of great interest in the field of information and communication technologies. Artificial neuron networks take their inspiration from the operation of the human brain and comprise a plurality of artificial neurons and a plurality of artificial synapses. The human brain comprises about $10^{11}$ neurons and $10^{15}$ synapses, each neuron being connected to other neurons via about $10^3$ to $10^4$ synapses.

Because of the large number of interneuronal connections, artificial synapses represent the greater part of a neuromorphic circuit. This is why the simplification and reduction in the size of artificial synapses is an important issue.

The role of an artificial synapse is to be a connection for communication between two neurons. An artificial synapse must therefore exhibit a conductance that is electrically adjustable. In order to create artificial synapses within neuromorphic circuits, the use of resistive random-access memories has therefore been proposed, and in particular resistive random-access memories of the OxRRAM ("Oxide Resistive Random Access Memory") type or resistive random-access memories of the CBRAM ("Conductive Bridge Random Access Memory") type. Resistive random-access memories of the OxRRAM type and resistive random-access memories of the CBRAM type are indeed capable of simulating the behaviour of biological synapses, that is, capable of modulating the strength of interneuronal connections.

In order to create an artificial synapse from resistive random-access memories of the OxRRAM type or of the CBRAM type, there are two known approaches in particular: an analogue approach and a binary approach.

According to the analogue approach, a single resistive random-access memory of the OxRRAM type or of the CBRAM type is used per artificial synapse, and at least three resistive states of said resistive random-access memory are implemented by means of electrical pulses of variable amplitude and/or duration generated by each neuron. This conventional analogue approach, however, which implies the use of at least three types of electrical pulses, requires the use of complex electronics. Each implemented resistive state indeed requires the use of a particular type of electrical pulse, each type of electrical pulse having a particular amplitude and duration.

According to the binary approach, for each artificial synapse a plurality of resistive random-access memories of the OxRRAM type or of the CBRAM type is used, which operate in parallel and only two resistive states of each resistive random-access memory is used: one high resistive state, known as the HRS ("High resistive State") or "OFF" state, and one low resistive state known as the LRS ("Low resistive state") or "ON" state. In this manner multi-level operation is achieved, which effectively allows modulation of an interneuronal connection to be performed, whilst using only two types of electrical pulse. The use of a plurality of resistive random-access memories within each artificial synapse nevertheless implies an increase in the size of each artificial synapse relative to an artificial synapse which uses only a single resistive random-access memory according to the analogue approach.

SUMMARY OF THE INVENTION

The invention offers a solution to the above mentioned problems, by proposing a method for programming an artificial neuron network, wherein a single resistive random-access memory is used per artificial synapse, whilst using at most only two types of electrical programming pulses.

One aspect of the invention relates to a method for programming an artificial neuron network which has a plurality of artificial synapses, each artificial synapse being a single resistive random-access memory, such as a OxRAM or CBRAM memory, in series with means of current limitation, with the resistive random-access memory comprising an active zone and first and second electrodes on either side of the active zone, the programming method comprising the following steps:

a step for determining the number N of conductance intervals, where N is a non-negative integer equal to or greater than three;

for each resistive random-access memory:
  a step for choosing a conductance interval from amongst the N previously determined conductance intervals;
  a step i) comprising:
    a first sub-step for application of a voltage pulse of a first type between the first and second electrodes of said resistive random-access memory, the voltage pulse of the first type having a first duration and a first amplitude, and
    a second sub-step for reading a conductance value of said resistive random-access memory;
  if said conductance value does not belong to the previously chosen conductance interval, a step ii), comprising:
    a first sub-step for application of a voltage pulse of a second type between the first and second electrodes of said resistive random-access memory, the voltage pulse of the second type having a second duration and a second amplitude, and
    a second sub-step for reading a conductance value of said resistive random-access memory;
  if said conductance value does not belong to the chosen conductance interval, a step according to which step i) is reiterated, steps i) and ii) being repeated until the conductance value of the resistive random-access memory belongs to the chosen conductance interval;
  where each voltage pulse of the first type applied during each step i) has the same first duration and the same first amplitude, and where each voltage pulse of the second type applied during each step ii) has the same second duration and the same second amplitude.

Thanks to the invention, the dispersion of the resistive states of a resistive random-access memory over a resistance range for a given programming current is advantageously used. The dispersion of the resistive states of a resistive random-access memory may designate the dispersion of the low resistive states LRS and/or the dispersion of the high resistive states HRS. Since the resistance is the inverse of the conductance, a conductance range exists which corresponds to said resistance range. Each of the N conductance intervals is chosen from amongst said conductance range. A resistance interval therefore corresponds to each conductance interval, the resistance interval comprising at least one resistive state of the resistive random-access memory.

A first resistive random-access memory is considered: for this first resistive random-access memory a conductance interval is chosen from amongst the N conductance intervals. It is subsequently a question of programming said first resistive random-access memory such that it exhibits a conductance belonging to the previously chosen conductance interval. In order to do this the voltage pulse of the first type is applied to the first resistive random-access memory in accordance with the first sub-step of step i). The second sub-step of step i) is used to determine whether the first resistive random-access memory exhibits the previously chosen conductance interval at the end of the application of the voltage pulse of the first type. If the first resistive random-access memory actually exhibits the chosen conductance interval, the programming of said first resistive random-access memory is terminated. If the first resistive random-access memory does not exhibit the chosen conductance interval, the second type of voltage pulse is applied to the first resistive random-access memory in accordance with the first sub-step of step ii). The second sub-step of step ii) is used to determine whether the first resistive random-access memory exhibits the previously chosen conductance interval at the end of the application of the voltage pulse of the second type. If the first resistive random-access memory actually exhibits the chosen conductance interval, the programming of said first resistive random-access memory is terminated. If the first resistive random-access memory does not exhibit the chosen conductance interval, step i) is repeated.

During the method, the programming current is fixed by the means of current limitation. The dispersion of the resistive states over a resistance range and the choice of conductance intervals over a conductance range which corresponds to the resistance range is used to confirm that the first resistive random-access memory is, at any given moment, actually programmed such that it exhibits a conductance which belongs to the chosen conductance interval.

Besides the characteristics which have just been stated in the preceding paragraph, the method for programming an artificial neuron network according to one aspect of the invention may exhibit one or more additional characteristics from amongst the following, considered individually or according to technically possible combinations:

The means of current limitation are chosen such that the current passing through the resistive random-access memory falls within the current zone for which the resistive random-access memory exhibits a single continuous conductance range.

Each resistive random-access memory is an OxRAM type memory.

Alternatively, each resistive random-access memory is a CBRAM type memory.

The means of current limitation for each artificial synapse is chosen such that the current passing through each resistive random-access memory is less than or equal to 20 µA.

The means of current limitation for each artificial synapse is chosen such that the current passing through each resistive random-access memory is greater than 1 µA.

The sign of the second type of voltage pulse is the opposite to that of the first type of voltage pulse. This characteristic allows a bipolar resistive random-access memory to be used.

Alternatively, the sign of the second type of voltage pulse is the same as that of the first type of voltage pulse. This characteristic alternatively allows a unipolar resistive random-access memory to be used.

The invention and its various applications will be better understood on reading the following description and on examination of the figures which accompany it.

BRIEF DESCRIPTION OF THE FIGURES

The figures are given for indication purposes and are not in any way intended to limit the invention.

DETAILED DESCRIPTION OF AT LEAST ONE EMBODIMENT OF THE INVENTION

Unless otherwise stated, a given element appearing in different figures has the same unique reference number.

Figure 1:
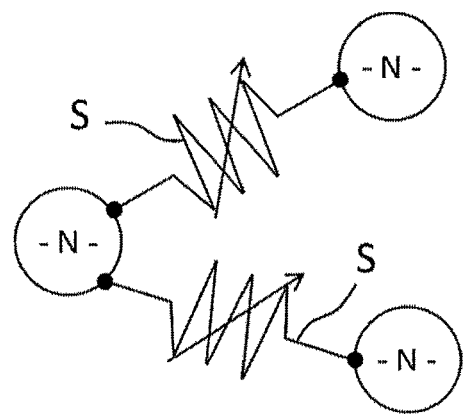
FIG. 1 shows a diagrammatic representation of an artificial neuron network.
Figure 2A:
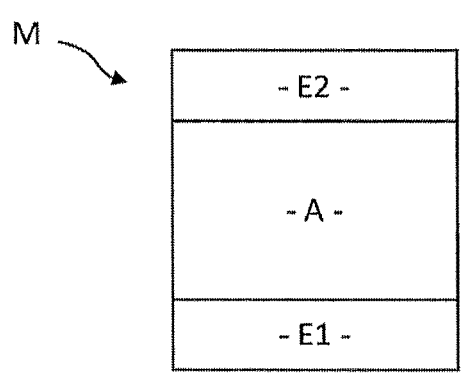
FIG. 2a shows a diagrammatic representation of a resistive random-access memory.
Figure 2B:
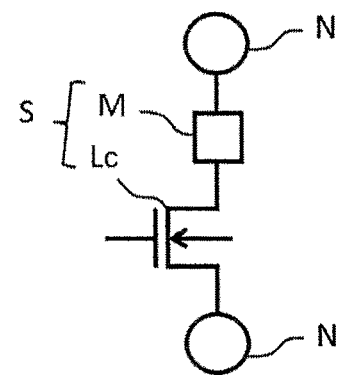
FIG. 2b shows a diagrammatic representation of an artificial synapse comprising a resistive random-access memory and a means of current limitation.

FIG. 1 shows a diagrammatic representation of an artificial neuron network. FIG. 2a shows a diagrammatic representation of a resistive random-access memory M. FIG. 2b shows a diagrammatic representation of an artificial synapse S comprising a resistive random-access memory M and a means of current limitation Lc.

FIGS. 1, 2a and 2b are described jointly.

The network in FIG. 1 comprises:
a plurality of artificial neurons N, and
a plurality of artificial synapses S.

Each artificial synapse S connects two artificial neurons N together. Each artificial neuron N is connected to at least one other artificial neuron N. Each artificial neuron N may be connected to several other artificial neurons N.

A significant parameter of an artificial neuron network is in particular the conductance of each artificial synapse. An artificial neuron network typically exhibits a learning phase during which the conductance of each artificial synapse is defined. This learning phase may in particular be a supervised learning phase ("off-line learning") or an unsupervised learning phase ("on-line learning"). During an unsupervised learning phase each synaptic conductance is determined in situ. During a supervised learning phase, on the other hand, each synaptic conductance is determined upstream, using computer-based simulations and then imported into the network in a single programming step. The method for programming an artificial neuron network according to one aspect of the invention more particularly relates to a method for programming an artificial neuron network by means of a supervised learning technique.

Each artificial synapse S comprises a single resistive random-access memory M in series with a means of current limitation Lc. The means of current limitation may be, for example, a resistance or a transistor. The advantage of using a transistor compared to a resistance is the ability to control the level of current limitation using the grid voltage.

The resistive random-access memory M comprises:
an active zone A,
a first electrode E1 and a second electrode E2, with the first and second electrodes E1 and E2 being arranged on either side of the active zone A.

Figure 2C:
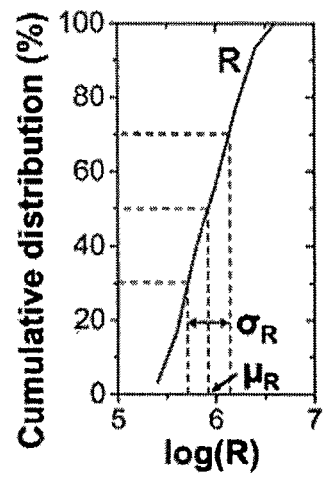
FIG. 2c shows a graph of a cumulative distribution function of the resistive states of a resistive random-access memory.

The resistive random-access memory M typically exhibits a plurality of low resistive states LRS and a plurality of high resistive states HRS. The plurality of low resistive states typically exhibits a first dispersion and the plurality of high resistive states HRS typically exhibits a second dispersion. A cumulative distribution function of the resistive states, or resistances, of the resistive random-access memory is considered. An example of such a cumulative distribution function is, for example, shown in FIG. 2c. In the present document, the term "dispersion of resistive states" or "variability in resistive states" refers to the interval between the resistive states at 30% and 70% of said cumulative distribution. In the specific example in FIG. 2c, the dispersion is thus identified by the symbol $\sigma_R$. The change of the resistive random-access memory M from a high resistive state HRS to a low resistive state LRS is typically achieved during a so-called "SET" step, by applying a SET voltage pulse between the terminals of the first and second electrodes E1 and E2 of the resistive random-access memory. The change of the resistive random-access memory M from a low resistive state LRS to a high resistive state HRS is typically achieved during a so-called "RESET" step, by applying a RESET voltage pulse between the terminals of the first and second electrodes E1 and E2 of the resistive random-access memory M. The RESET voltage pulse exhibits a duration which is typically different from the duration of the SET pulse. The RESET voltage pulse exhibits an amplitude which is typically different from the SET pulse amplitude. The SET voltage pulse and the RESET voltage pulse can, however, in certain cases exhibit the same duration and/or the same amplitude. In the typical case of a bipolar-type resistive random-access memory, the RESET voltage pulse has an opposite sign to the SET voltage pulse; the SET pulse is typically positive whereas the RESET pulse is typically negative. In the alternative case of a unipolar-type resistive random-access memory, the SET voltage pulse and the SET voltage pulse are of the same sign.

According to a first alternative, the resistive random-access memory M may be an OxRRAM ("Oxide Resistive Random Access Memory") type resistive random-access memory. According to this first alternative, the active zone A comprises an active oxide-based material, such as a binary oxide of a transition metal. The first and second electrodes E1 and E2 arranged on either side of the active zone A are two metallic electrodes. A resistive random-access memory M of the OxRRAM type is therefore a metal-oxide-metal ("metal-insulator-metal") structure.

According to a second alternative, the resistive random-access memory M may be a CBRAM ("Conductive Bridge Random Access Memory") type resistive random-access memory. According to this second alternative:
the active zone A comprises an ionic conduction material which forms a solid ionic conduction electrolyte.
the first electrode E1 forms an inert cathode, and
the second electrode E2 comprises a portion of ionisable metal, that is, a portion of metal which can easily form metal ions, and forms a soluble anode.

Figure 3:
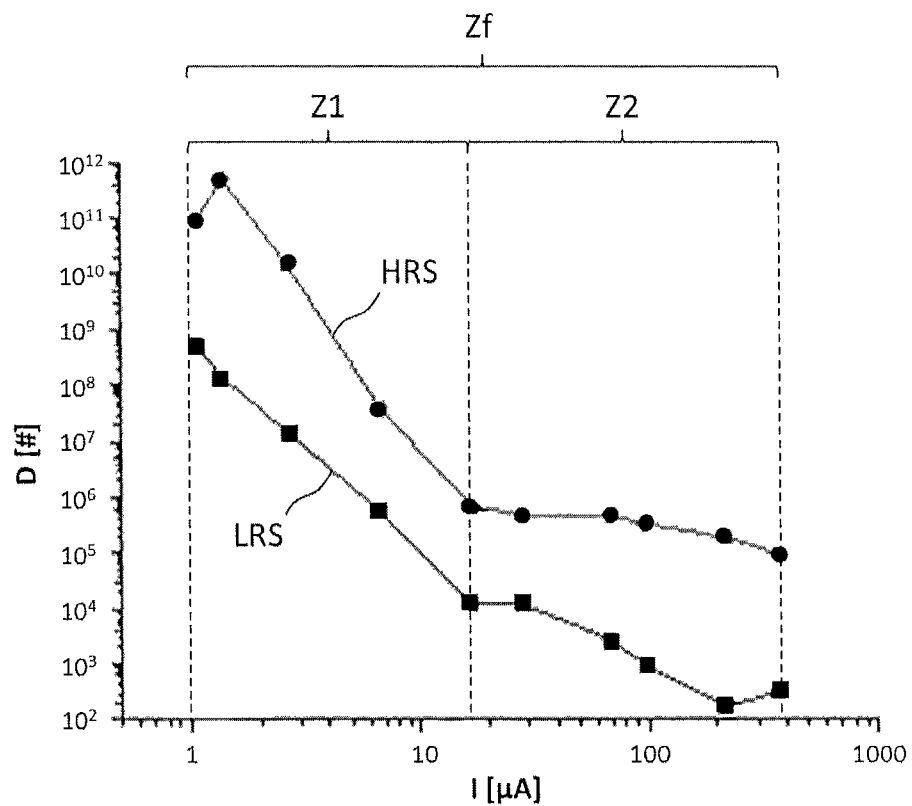
FIG. 3 shows a graph of the dispersion of the low resistive states and of the dispersion of the high resistive states of a resistive random-access memory, as a function of the current passing through the resistive random-access memory.

FIG. 3 shows a dispersion graph D of the low resistive states LRS and of the high resistive states HRS of a resistive random-access memory M, as a function of the current I flowing in the resistive random-access memory M. FIG. 3 shows a region Zf of the operating current of the resistive random-access memory M. The region Zf comprises a first zone Z1 and a second zone Z2. The currents in the first zone Z1 are smaller than the currents in the second zone Z2.

The second zone Z2 allows "conventional" operation of a resistive random-access memory, according to which the resistive random-access memory is capable of changing from a low resistive state LRS, or "ON" state, to a high resistive state HRS or "OFF" state, and vice versa, the low resistive state LRS and the high resistive state HRS being distinct from one another. The term "distinct from one another" refers to the fact that there is a resistance range which separates the plurality of low resistive states LRS on the one hand and the plurality of the high resistive states HRS on the other hand, said resistance range comprising no low resistive state and no high resistive state. The first dispersion of the low resistive states and the second dispersion of the high resistive states do not overlap.

The first zone Z1 does not allow conventional operation, described above, of a resistive random-access memory. Indeed, in the first zone Z1 the first dispersion of the low resistive states LRS and the second dispersion of the high resistive states HRS overlap. In other words, in the first zone Z1, the resistance of a resistive random-access memory in a "low" resistive state achieved after application of a SET pulse may be greater than or equal to the resistance of said resistive random-access memory in a "high" resistive state HRS achieved after application of a RESET pulse.

Figure 4:
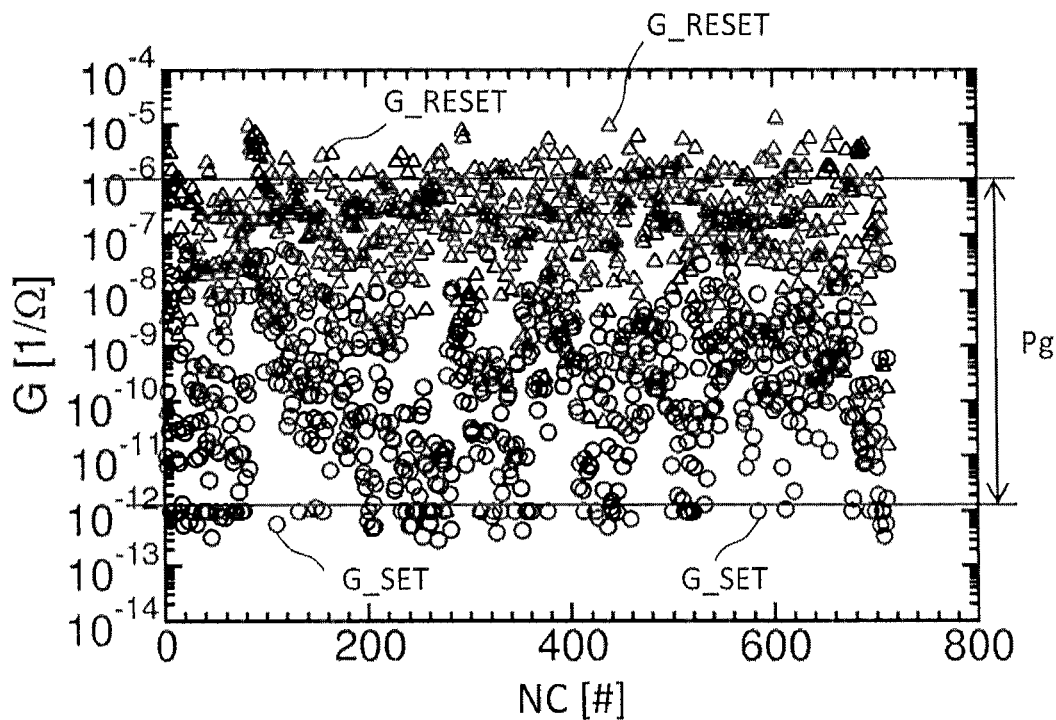
FIG. 4 shows a graph of the conductance values obtained for a resistive random-access memory as a function of the number of cycles made of a voltage pulse of a first type and of a voltage pulse of a second type.

FIG. 4 shows a graph of the conductance values G obtained for a resistive random-access memory M in the first current zone Z1 described previously, as a function of the number of cycles NC of a SET voltage pulse and of a RESET voltage pulse performed. Each conductance value G_SET achieved after a SET step is shown by a round marker in FIG. 4. Each conductance value G_RESET achieved after a RESET step is shown by a triangular marker in FIG. 4. FIG. 4 shows the overlap, described previously, of the first dispersion of the low resistive states LRS and of the second dispersion of high resistive states HRS when the resistive random-access memory M is used in the first current zone Z1. When the resistive random-access memory M is used in the first current zone Z1, the resistive random-access memory M exhibits a single continuous range of conductance Pg. In the specific example in FIG. 4 the conductance range Pg extends between $10^{-12}\Omega^{-1}$ and $10^{-6}\Omega^{-1}$, that is over six orders of magnitude.

Figure 5:
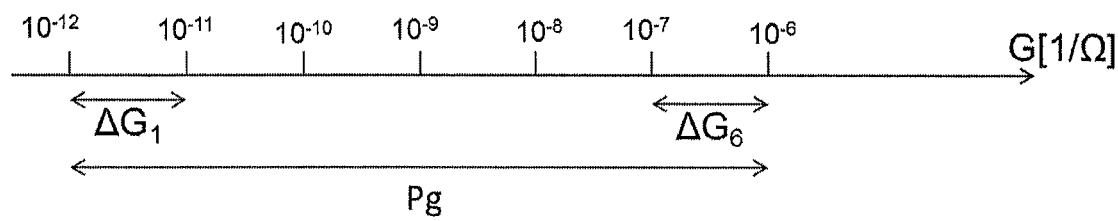
FIG. 5 shows a diagrammatic representation of a plurality of conductance intervals determined over a conductance range of a resistive random-access memory.

FIG. 5 shows a diagrammatic representation of a plurality of conductance intervals determined over a conductance range of a resistive random-access memory. In the specific example of FIG. 5, the conductance range Pg of FIG. 4 is divided into six conductance intervals:

a first conductance interval $\Delta G_1$ such that:

$$10^{-12}\Omega^{-1} \leq \Delta G_1 < 10^{-11}\Omega^{-1}$$

a second conductance interval $\Delta G_2$ such that:

$$10^{-11}\Omega^{-1} \leq \Delta G_2 < 10^{-10}\Omega^{-1}$$

a third conductance interval $\Delta G_3$ such that:

$$10^{-10}\Omega^{-1} \leq \Delta G_3 < 10^{-9}\Omega^{-1}$$

a fourth conductance interval $\Delta G_4$ such that:

$$10^{-9}\Omega^{-1} \leq \Delta G_4 < 10^{-8}\Omega^{-1}$$

a fifth conductance interval $\Delta G_5$ such that:

$$10^{-8}\Omega^{-1} \leq \Delta G_5 < 10^{-7}\Omega^{-1}$$

and a sixth conductance interval $\Delta G_6$ such that:

$$10^{-7}\Omega^{-1} \leq \Delta G_6 < 10^{-6}\Omega^{-1}$$

In the specific example in FIG. 5, the conductance range Pg is divided into conductance intervals of the same size or extent. Alternatively, the conductance range Pg could be divided into conductance intervals of different sizes or extent.

Figure 6:
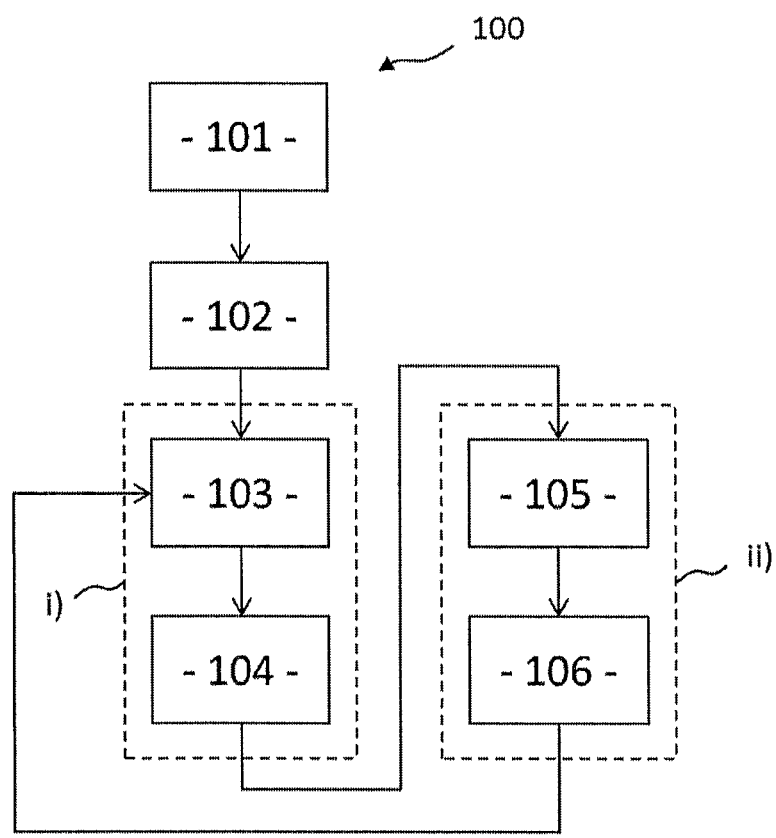
FIG. 6 shows a diagram of the steps in a method for programming an artificial neuron network according to a first embodiment of the invention.

FIG. 6 shows a diagram of the steps in a method 100 for programming an artificial neuron network N according to one embodiment of the invention, where the network of artificial neurons N has a plurality of artificial synapses S, each artificial synapse S being a single resistive random-access memory M, such as an OxRRAM or CBRAM memory, in series with means of current limitation, with the resistive random-access memory M comprising an active zone A and first and second electrodes E1, E2 on either side of the active zone.

A network of artificial neurons N compatible with the present invention has previously been described in connection with FIG. 1. A resistive random-access memory M compatible with the present invention has previously been described in connection with FIG. 2a. According to the method 100 for programming a network of artificial neurons, the means of current limitation for each artificial synapse S may be chosen such that the current passing through each resistive random-access memory M belongs to the second current zone Z2, described previously in connection with FIG. 3. However, according to the method 100 for programming a network of artificial neurons, the means of current limitation for each artificial synapse S is preferably chosen such that the current passing through each resistive random-access memory M belongs to the first current zone Z1, described previously in connection with FIG. 3.

According to a step which is not shown, the optimum programming conditions, in the meaning of the present invention, are determined for a resistive random-access memory M. An example of the determination of optimum programming conditions for a resistive random-access memory M is shown in FIG. 3 which has been previously described. FIG. 3 shows that the dispersion of the low resistive states LRS and the dispersion of the high resistive states HRS both depend on the programming current I. The smaller the programming current I, the greater the dispersion of the low resistive states LRS and of the high resistive states HRS. Optimum programming conditions according to the present invention thus comprise a programming current I which belongs to the first zone Z1, such as previously defined. In this case, the means of current limitation for each artificial synapse S is chosen or adjusted such that the current passing through each resistive random-access memory belongs to the first zone Z1. The first zone Z1 may typically be such that:

$$1 \,\mu A < Z1 \leq 20 \,\mu A$$

The preceding framework is given as an indication: In general, the first zone Z1 is, within an operating region Zf, the current zone for which a resistive random-access memory exhibits the greatest variability of resistive states, such that there is an overlap between the low resistive states and the high resistive states of said resistive random-access memory M and that said resistive random-access memory M exhibits a single continuous conductance range, as described previously in connection with FIG. 4.

The step for determining the optimum programming conditions which has just been described is optional. Indeed, the method 100 for programming a network of artificial neurons according to one aspect of the invention may alternatively use a programming current I belonging to the second zone Z2 such as previously described. In this case, the means of current limitation for each artificial synapse S is chosen or adjusted such that the current passing through each resistive random-access memory belongs to the second current zone Z2. When the programming current I belongs to the second current zone Z2, the resistive random-access memory exhibits two distinct, discontinuous conductance ranges.

According to another step that is not shown, a conductance range of the resistive random-access memory M is determined for a given programming current. As explained previously, the programming current advantageously belongs to the first zone Z1 as previously defined. Alternatively, the programming current may nevertheless belong to the second zone Z2 as previously defined. The programming current belongs, in either case, to an operating zone Zf of the resistive random-access memory M. An example of the determination of a range of conductance of a resistive random-access memory M, for a given programming current, is shown in FIG. 4, which has been described previously. In the specific example in FIG. 4, a cycle of SET and or RESET voltage pulses is carried out to determine a conductance range of a resistive random-access memory M for a programming current of 6 $\mu A$. In the specific example of FIG. 4, the programming current of 6 $\mu A$ is an optimum programming current, which has been determined during the optional step for determining the optimum programming conditions previously described. In the specific example of FIG. 4, the resistive random-access memory M exhibits a conductance range Pg of between $10^{-12}\Omega^{-1}$ and $10^{-6}\Omega^{-1}$.

According to a step 101 of the method 100, a number N of conductance intervals is determined, where N is a non-negative integer equal to or greater than three. FIG. 5 described previously shows an example of determination of a number N of conductance intervals according to step 101.

For each resistive random-access memory M of the network of artificial neurons, a conductance interval is chosen according to a step 102 from amongst the N conductance intervals previously determined during step 101. The choice of a conductance interval corresponds to choosing a synaptic conductance during a supervised learning phase.

For each resistive random-access memory M of the network of artificial neurons, a step i) is therefore carried out which comprises:

a first sub-step 103 according to which a voltage pulse of a first type is applied between the first and second electrodes E1, E2 of said resistive random-access memory M, the voltage pulse of the first type having a first duration and a first amplitude, and a second sub-step 104 according to which a conductance value of said resistive random-access memory M is read;

The voltage pulse of a first type may be a SET pulse. Alternatively the voltage pulse of a first type may also be a RESET pulse.

If the conductance value that is read during the second sub-step 104 of step i) belongs to the conductance interval chosen previously, the programming of the resistive random-access memory being considered is terminated. If, on the other hand, said conductance values does not belong to the previously chosen conductance interval, a step ii) is carried out, comprising;

a first sub-step 105 for application of a voltage pulse of a second type between the first and second electrodes E1, E2 of said resistive random-access memory M, the voltage pulse of the second type having a second duration and a second amplitude, and a second sub-step 106 for reading a conductance value of said resistive random-access memory M.

If the voltage pulse of a first type was a SET pulse, then the voltage pulse of a second type is typically a RESET pulse. If the voltage pulse of a first type was a RESET pulse, then the voltage pulse of a second type is typically a SET pulse. The second duration of the voltage pulse of a second type may be the same as the first duration of the voltage pulse of a first type. The second amplitude of the voltage pulse of a second type may be the same as the first amplitude of the voltage pulse of a first type. In the case of a resistive random-access memory M of a bipolar type, a voltage pulse of the second type is advantageously used which has a sign which is opposite to that of the voltage pulse of the first type. In the alternative case of a resistive random-access memory M of a unipolar type, a voltage pulse of the second type is advantageously used which has a sign which is the same as that of the voltage pulse of the first type.

If the conductance value that is read during the second sub-step 106 of step ii) belongs to the conductance interval chosen previously, the programming of the resistive random-access memory being considered is terminated. If, on the other hand said conductance value does not belong to the previously chosen conductance interval, step i) is reiterated. Steps i) and ii) are repeated until the conductance value of the resistive random-access memory M belongs to the chosen conductance interval. Each voltage pulse of the first type applied during each step i) has the same first duration and the same first amplitude. Each voltage pulse of the second type applied during each step ii) has the same second duration and the same second amplitude. Therefore the programming of a network of artificial neurons is carried out using only and at most two types of voltage pulse.

Figure 7:
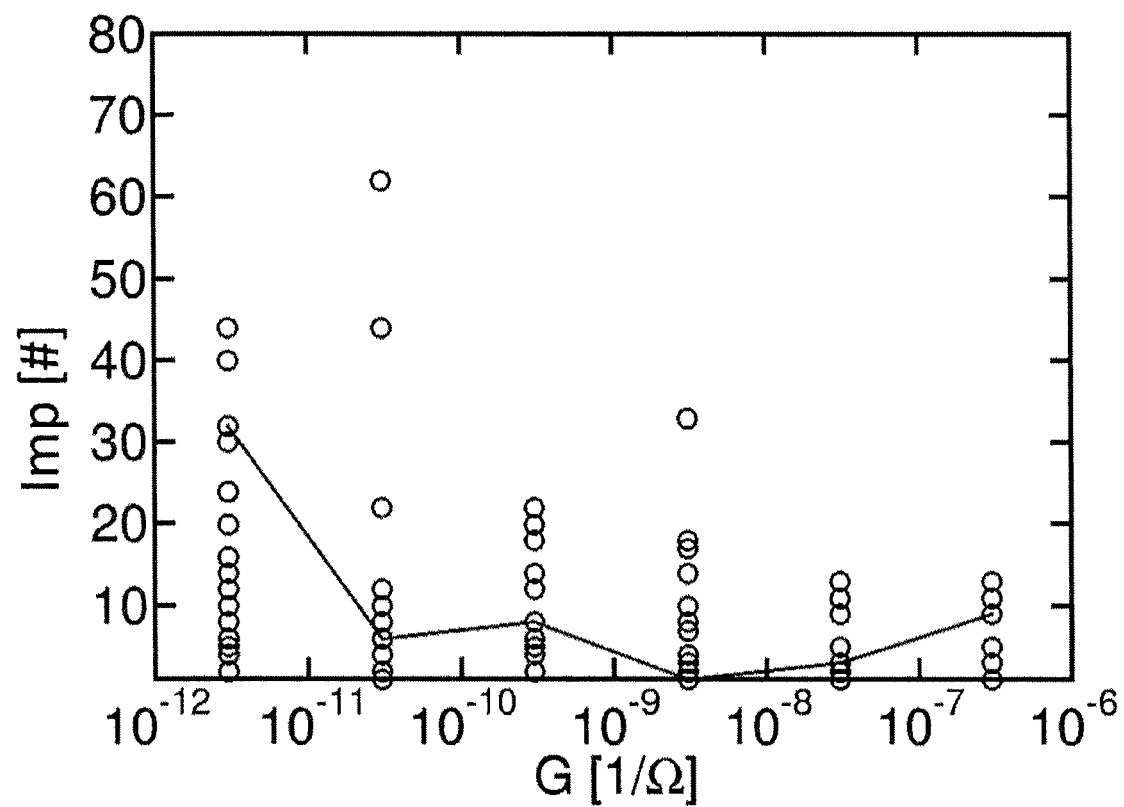
FIG. 7 shows a graph of the number of voltage pulses necessary to reach a given conductance interval for a resistive random-access memory.

FIG. 7 shows a graph of the number of voltage pulses necessary to reach a given conductance interval for a resistive random-access memory. The specific example in FIG. 7 shows that:

in the worst case about sixty voltage pulses, that is thirty or so cycles (voltage pulse of a first type/voltage pulse of a second type) are used to achieve a determined conductance interval;

in the best case a single voltage pulse (voltage pulse of a first type or voltage pulse of a second type) is used to achieve a determined conductance interval;

over the six conductance intervals considered in this specific example, it has required on average thirty or so voltage pulses to achieve an interval, and on average ten voltage pulses or less have been required to achieve the five other intervals.

The invention claimed is:

1. A method for programming an artificial neuron network which has a plurality of artificial synapses, each artificial synapse being a single resistive random-access memory in series with a current limitation system, and the resistive random-access memory comprising an active zone and first and second electrodes on either side of the active zone, the programming method comprising:

for each resistive random-access memory a step for choosing a current passing through said resistive random-access memory such that the current belongs to a range of current for which a plurality of low resistive states of said resistive random-access memory exhibits a first dispersion and a plurality of high resistive states of said resistive random-access memory exhibits a second dispersion, the first dispersion overlapping the second dispersion so as to form a single continuous range of conductance, each dispersion of said first and second dispersions corresponding to an interval between the resistive states at 30% and 70% of a cumulative distribution of the resistive states;

a step for determining a number N of conductance intervals comprised in the single continuous range of conductance, where N is a non-negative integer equal to or greater than three; and a step for choosing a conductance interval from amongst the N determined conductance intervals;

a step i) comprising:

a first sub-step for application of a voltage pulse of a first type between the first and second electrodes of said resistive random-access memory, the voltage pulse of the first type having a first duration and a first amplitude, and a second sub-step for reading a first conductance value of said resistive random-access memory;

if said first conductance value does not belong to the chosen conductance interval, a step ii) comprising:

a first sub-step for application of a voltage pulse of a second type between the first and second electrodes of said resistive random-access memory, the voltage pulse of the second type having a second duration and a second amplitude, and a second sub-step for reading a second conductance value of said resistive random-access memory; and if said second conductance value does not belong to the chosen conductance interval, step i) is reiterated, where steps i) and ii) are repeated until a conductance value of the resistive random-access memory belongs to the chosen conductance interval, where each voltage pulse of the first type applied during each step i) has the same first duration and the same first amplitude, and where each voltage pulse of the second type applied during each step ii) has the same second duration and the same second amplitude.

2. The method of claim 1, wherein each resistive random-access memory is an OxRAM type memory.

3. The method of claim 1, wherein each resistive random-access memory is a CBRAM type memory.

4. The method of claim 1, wherein the current limitation system is chosen for each artificial synapse such that a current passing through each resistive random-access memory is less than or equal to 20 µA.

5. The method of claim 1, wherein the current limitation system is chosen for each artificial synapse such that a current passing through each resistive random-access memory is greater than 1 µA.

6. The method of claim 1, wherein a sign of the voltage pulse of the second type is opposite to that of the voltage pulse of the first type.

7. The method of claim 1, wherein a sign of the voltage pulse of the second type is the same as that of the voltage pulse of the first type.

8. The method of claim 1, wherein the current limitation system is a resistance or a transistor.

9. The method of claim 1, wherein the single resistive random-access memory uses at most two types of voltage pulses.

10. The method of claim 1, wherein a size of each conductance interval is equal to sizes of other conductance intervals.

11. The method of claim 1, wherein a size of each conductance interval is distinct from sizes of other conductance intervals.

12. The method of claim 1, wherein the active zone comprises an active-oxide based material.

13. The method of claim 1, wherein the first and second electrodes on either side of the active zone are metallic electrodes.

14. The method of claim 1, wherein the voltage pulse of the first type is a SET pulse and the voltage pulse of the second type is a RESET pulse.

15. The method of claim 1, wherein the plurality of resistive states includes a first state in which the voltage pulse of the first type is applied between the first and second electrodes of said resistive random-access memory and a second state in which the voltage pulse of the second type is applied between the first and second electrodes of said resistive random-access memory.

* * * * *